United States Patent
Paladini (10) Patent No.: US 6,570,952 B2
(45) Date of Patent: May 27, 2003

(54) MEMORY EFFICIENT SHEAR-WARP VOXEL PROJECTION ALGORITHM

(75) Inventor: Gianluca Paladini, Princeton, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 10/083,867

(22) Filed: Feb. 26, 2002

(65) Prior Publication Data

US 2002/0181663 A1 Dec. 5, 2002

Related U.S. Application Data

(60) Provisional application No. 60/271,663, filed on Feb. 27, 2001.

(51) Int. Cl.[7] .............................................. A61B 6/03
(52) U.S. Cl. ............................. 378/4; 378/19; 378/901
(58) Field of Search ........................... 378/4, 8, 15, 901

(56) References Cited

U.S. PATENT DOCUMENTS

| | | | | |
|---|---|---|---|---|
| 5,787,889 A | * | 8/1998 | Edwards et al. | 600/443 |
| 6,407,737 B1 | * | 6/2002 | Zhao et al. | 345/424 |
| 2003/0012419 A1 | * | 1/2003 | Accomazzi | 382/131 |

FOREIGN PATENT DOCUMENTS

| | | |
|---|---|---|
| EP | 1054353 | 11/2000 |
| WO | WO 98/47105 | 10/2002 |

OTHER PUBLICATIONS

Csebfalvi B et al: "Fast Maximum Intensity Projection Using Binary Shear-Warp Factorization" International Conference in Central Europe on Computer Graphics Visualization and Interactive Digital Media. In co-operation conference with Eurographics and IFIP WSCG. Conference Proceedings, XX, XX, Feb. 8, 1999, pp. 47–54, XP001040084 abstract p. 50, left–hand column, last paragraph–p. 52, right–hand column, paragraph 4.
WO9847105 A (Univ New York) Oct. 22, 1998 p. 32, line 29–p. 33, line 18 figures 35, 43.
Lacroute P G: "Fast Volume Rendering Using a Shear-Warp Factorization of the Viewing Transform" Technical Report CSL-TR-95-678, XX, XX, Sep. 1995, pp. 1–222, XP002152644 p. 29–p. 433, p. 192–p. 210.
EP1054353A (Mitsubishi Electric Corp.) Nov. 22, 2000 the whole document.
XP-001040084–Csebfalvi B et al: "Fast Maximum Intensity Projection using Binary Shear–Warp Factorization" Feb. 8, 1999, pp. 47–54, abstract p. 50, left hand column, last paragraph—p. 52, right hand column, paragraph 4.
XP-002152644–Lacroute P G: "Fast Volume Rendering Using a Shear–Warp Factorization of the Viewing Transformation" Sep. 1995, p. 1–222, p. 29– p. 43; p. 192—p. 210.

* cited by examiner

Primary Examiner—David Vernon Bruce
(74) Attorney, Agent, or Firm—Donald B. Paschburg; F. Chau & Associates, LLP (57) ABSTRACT

A method is provided for generating an image of a three-dimensional (3D) volume from a plurality of slices corresponding to a scan of the 3D volume, each of the plurality of slices comprising slice data for sample points within an image plane, each of the sample points being stored sequentially in rows of scan lines, the method comprising the steps of: selecting a permutation matrix such that each of the sample points stored in the scan lines of all of the plurality of slices can be projected in a sequential order without requiring the slice data to be transposed for two out of three dominant viewing directions respectively corresponding to two of out of three dimensions; and rendering the image by accessing the sample points in a voxel-by-voxel, row-by-row, and slice-by-slice sequence.

26 Claims, 9 Drawing Sheets

MEMORY EFFICIENT SHEAR-WARP VOXEL PROJECTION ALGORITHM

CROSS REFERENCE TO RELATED APPLICATION

The present application claims priority to U.S. Provisional Patent Application Serial No. 60/271,663, filed Feb. 27, 2001, which is hereby Incorporated by reference.

BACKGROUND

1. Technical Field

The present invention generally relates to three-dimensional imaging and, in particular, to a memory efficient shear-warp volume rendering method.

2. Background Description

Shear-warp volume rendering algorithms transform a volume to an intermediate coordinate system, referred to as the "sheared object space", in which voxel data can be projected efficiently. The transposed dataset having the set of slices most perpendicular to the viewing direction is projected in sheared object space, and then the resulting intermediate image is warped back from sheared object coordinates to image coordinates to produce the final output image.

Conventional shear-warp algorithms by Klein et al., Lacroute et al., Cameron et al., and so forth, transpose voxel data so that parallel slices can be sheared into an intermediate image. Two additional transposed copies of the voxel data are generated, usually during a pre-processing step, leading to triple redundancy of data in memory. The shear-warp algorithm of Klein et al., is described in "A Prebuffer Algorithm for Instant Display of Volume Data", Proceedings of SPIE (Architectures and Algorithms for Digital Image Processing), Vol. 596, pp. 54–58, 1985. The shear-warp algorithm of Lacroute et al. is described in "Fast Volume Rendering Using a Shear-Warp Factorization of the Viewing Transform", ACM SIGGRAPH Computer Graphics Proceedings, Annual Conferences Series, July, pp. 451–458, 1994. The shear-warp algorithm of Cameron et al., is described in "Rendering Volumetric Medial Image Data on a SIMD Architecture Computer", Proceedings of the Third Eurographics Workshop on Rendering, Bristol, UK, pp. 135–145, 1992.

Accordingly, it would be desirable and highly advantageous to have a shear-warp method that eliminates the two additional and redundant transposed datasets and that always traverses the original dataset in a slice-by-slice fashion, without having to generate transposed data.

SUMMARY OF THE INVENTION

The problems stated above, as well as other related problems of the prior art, are solved by the present invention, a memory efficient shear-warp method.

Advantageously, the method of the present invention produces results at least identical to existing shear-warp algorithms with respect to image rendering, but with the following advantages over the existing shear-warp algorithms. The pre-processing time to generate transposed slices is not needed. Moreover, the triple redundancy of allocated memory for transposed data is not needed. Further, it is not necessary to access memory addresses in transposed order (which also would require all the volume slices to be located in memory).

The method of the present invention has very low memory requirements since, for example, the original voxel data is preferably always accessed in a slice-by-slice fashion. Therefore, as long as the computer has enough memory to hold one slice of data, volumes with an unlimited number of slices can be rendered.

According to an embodiment of the present invention, a method for generating an image of a three-dimensional (3D) volume from a plurality of slices corresponding to a scan of the 3D volume is provided, each of the plurality of slices comprising slice data for sample points within an image plane, each of the sample points being stored sequentially in rows of scan lines, the method comprising the steps of: selecting a permutation matrix such that each of the sample points stored in the scan lines of all of the plurality of slices can be projected in a sequential order without requiring the slice data to be transposed for two out of three dominant viewing directions respectively corresponding to two of out of three dimensions; and rendering the image by accessing the sample points in a voxel-by-voxel, row-by-row, and slice-by-slice sequence.

According to another embodiment of the present invention, a method is provided for generating an image of a three-dimensional (3D) volume from a plurality of slices corresponding to a scan of the 3D volume, each of the plurality of slices comprising slice data for sample points within an image plane, each of the sample points being stored sequentially in rows of scan lines, said method comprising the steps of: selecting a permutation matrix such that each of the sample points stored in the scan lines of all of the plurality of slices can be projected in a sequential order without requiring the slice data to be transposed for two out of three dominant viewing directions respectively corresponding to two of out of three dimensions; constructing a look-up table (LUT) having a plurality of entries for storing integer pixel locations of shear projection coordinates that represent sheared locations to be used in a sheared projection of the sample points onto an intermediate shear image buffer; and rendering the image by accessing the sample points in a voxel-by-voxel, row-by-row, and slice-by-slice sequence.

A method is also provided for generating an image of a three-dimensional (3D) volume from a plurality of slices corresponding to a scan of the 3D volume, each of the plurality of slices comprising slice data for sample points within an image plane, each of the sample points being stored sequentially in rows of scan lines, the method comprising the steps of: determining a dominant axis of a viewing transformation chosen for generating an image of the three-dimensional volume; selecting a permutation matrix such that each of the sample points stored in the scan lines of all of the plurality of slices can be projected in a sequential order without requiring the slice data to be transposed for two out of three dominant viewing directions respectively corresponding to two of out of three dimensions; factorizing a permuted viewing transformation to obtain shear and warp transformation matrices; computing a size of an intermediate shear image buffer in which all of the sample points will be projected; computing a set of shear projection coordinates that represent sheared locations to be used for a sheared projection of the sample points onto the intermediate shear image buffer, according to the shear transformation matrix; determining an optimal traversal order through the sample points, based on a first determination of whether each of the plurality of slices are to be traversed sequentially front-to-back or back-to-front, a second determination of whether the scan lines are to be traversed sequentially top to bottom or bottom to top, and a third determination of whether the scan lines are to be traversed sequentially from left to right or from right to left;

traversing and projecting the sample points stored in each of the scan lines; warping a resulting shear image buffer onto the image, according to the shear transformation matrix.

According to still another aspect of the invention, a program storage device is provided, the device having a program executable by a computer for performing method steps for generating an image of a three-dimensional (3D) volume from a plurality of slices corresponding to a scan of the 3D volume, each of the plurality of slices comprising slice data for sample points within an image plane, each of the sample points being stored sequentially in rows of scan lines, the method comprising the steps of: selecting a permutation matrix such that each of the sample points stored in the scan lines of all of the plurality of slices can be projected in a sequential order without requiring the slice data to be transposed for two out of three dominant viewing directions respectively corresponding to two of out of three dimensions; and rendering the image by accessing the sample points in a voxel-by-voxel, row-by-row, and slice-by-slice sequence.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

The present invention is directed to a memory efficient shear-warp method. It is to be understood that the present invention may be implemented in various forms of hardware, software, firmware, special purpose processors, or a combination thereof. Preferably, the present invention is implemented as software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Figure 1:
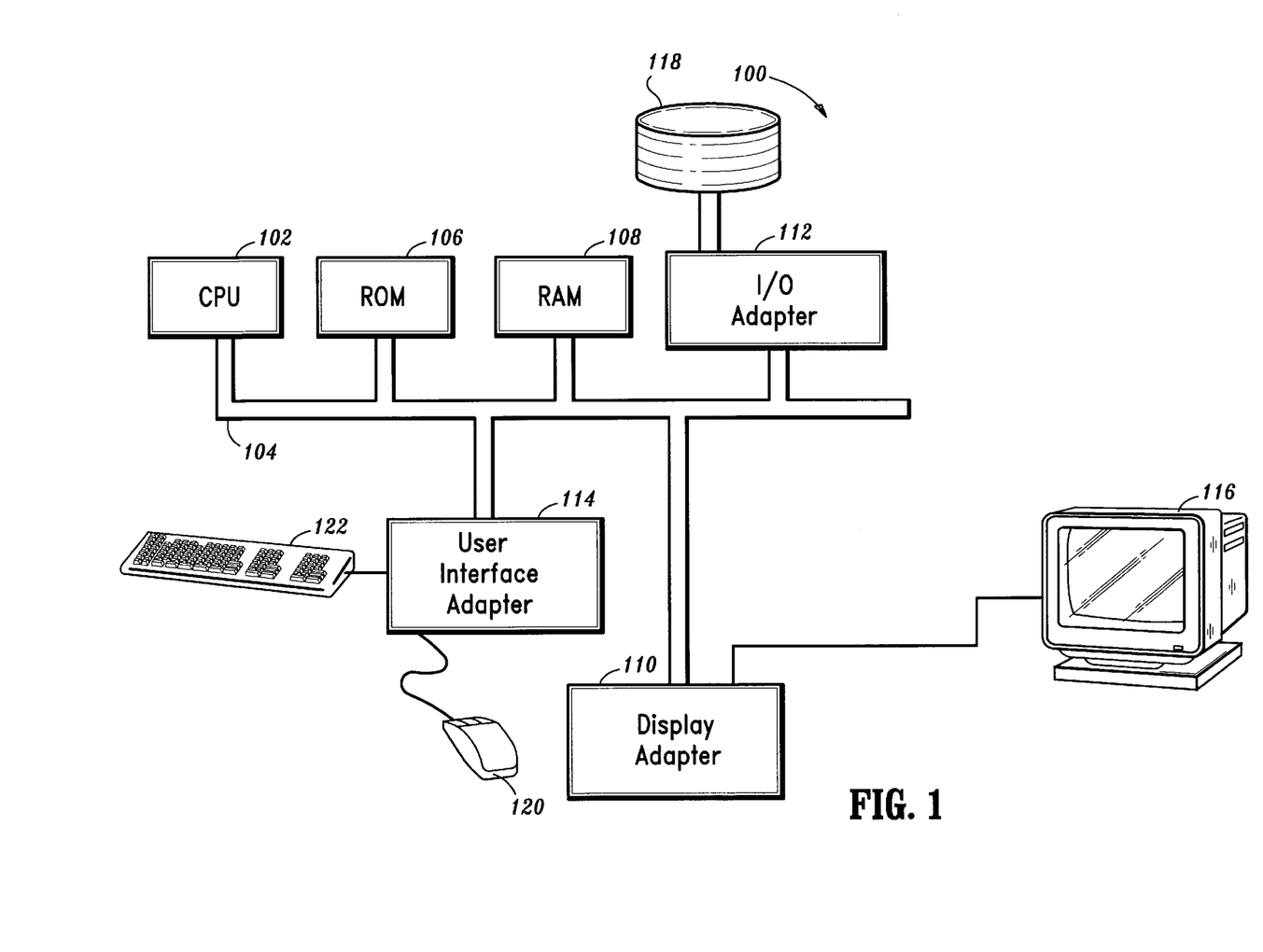
FIG. 1 is a block diagram of a computer processing system 100 to which the present invention may be applied according to an illustrative embodiment thereof.

FIG. 1 is a block diagram of a computer processing system 100 to which the present invention may be applied according to an illustrative embodiment thereof. The computer processing system 100 includes at least one processor (CPU) 102 operatively coupled to other components via a system bus 104. A read only memory (ROM) 106, a random access memory (RAM) 108, a display adapter 110, an I/O adapter 112, and a user interface adapter 114 are operatively coupled to the system bus 104.

A display device 116 is operatively coupled to the system bus 104 by the display adapter 110. A disk storage device (e.g., a magnetic or optical disk storage device) 118 is operatively coupled to the system bus 104 by the I/O adapter 112.

A mouse 120 and keyboard 122 are operatively coupled to the system bus 104 by the user interface adapter 114. The mouse 120 and keyboard 122 may be used to input/output information to/from the computer processing system 100. 10.

Figure 2:
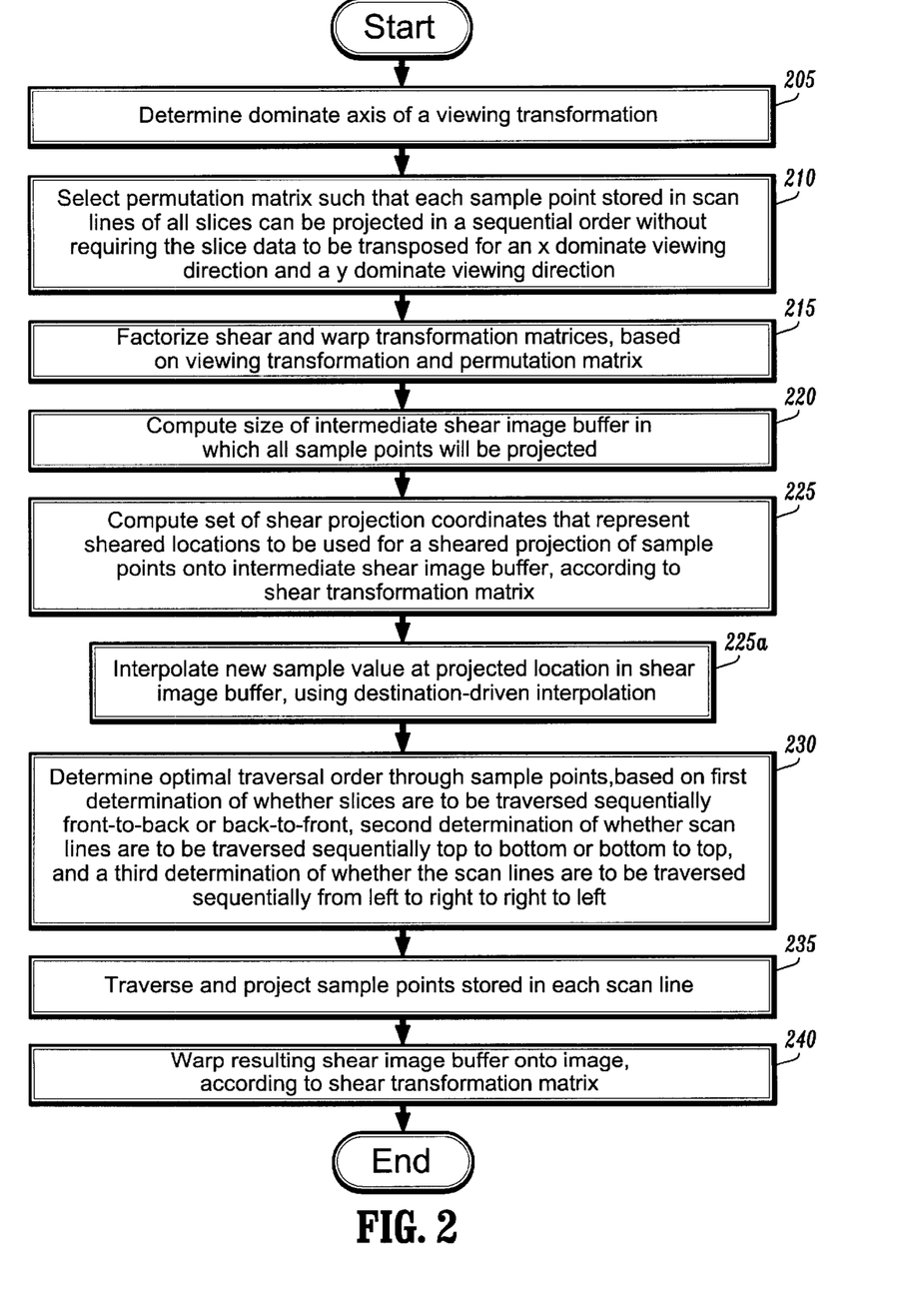
FIG. 2 is a flow diagram illustrating a method for generating an image of a three-dimensional (3D) volume from a plurality of slices corresponding to a scan of the 3D volume, according to an illustrative embodiment of the present invention.

FIG. 2 is a flow diagram illustrating a method for generating an image of a three-dimensional (3D) volume from a plurality of slices corresponding to a scan of the 3D volume, according to an illustrative embodiment of the present invention. Each of the plurality of slices includes slice data for sample points within an image plane. Each sample point, also known as a "voxel", is stored sequentially in rows of scan lines. Each of the scan lines has the same number of sample points. Each of the plurality of slices has the same number of scan lines.

A dominant axis of a viewing transformation chosen for generating an image of the three-dimensional volume is determined (step 205). A permutation matrix is selected such that each of the sample points stored in the scan lines of all of the plurality of slices can be projected in a sequential order without requiring the slice data to be transposed for an x dominant viewing direction and a y dominant viewing direction (step 210).

Shear and warp transformation matrices are computed, based on the factorization of the permuted viewing transformation matrix (step 215).

A size of an intermediate shear image buffer in which all of the sample points will be projected is computed (step 220).

A set of shear projection coordinates is computed that represent sheared locations to be used for a sheared projection of the sample points onto the intermediate shear image buffer, according to the shear transformation matrix (step 225). Step 225 may optionally include the step of interpolating a new sample value at the projected location in the shear image buffer, using destination-driven interpolation (step 225a).

An optimal traversal order through the sample points is determined, based on a first determination of whether each of the plurality of slices are to be traversed sequentially front-to-back or back-to-front, a second determination of whether the scan lines are to be traversed sequentially top to bottom or bottom to top, and a third determination of whether the scan lines are to be traversed sequentially from left to right or from right to left (step 230). The sample points stored in each of the scan lines are traversed and projected (step 235).

A resulting shear image buffer is warped onto the image, according to the shear transformation matrix (step 240).

A description will now be given of a modified permutation matrix according to an illustrative embodiment of the present invention.

Figure 3:
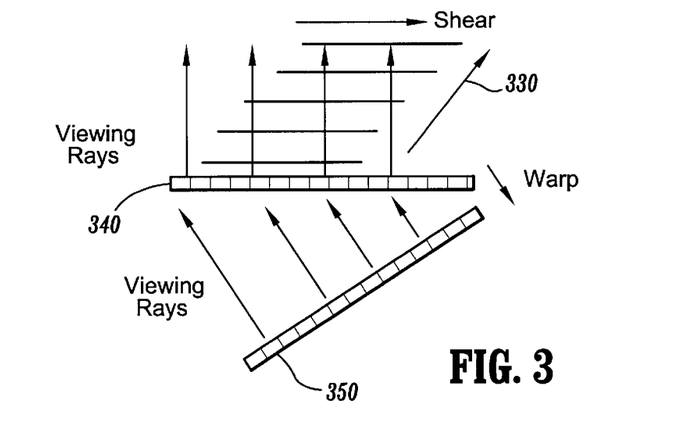
FIG. 3 is a diagram illustrating a final output image resulting from a shear-warp method.

FIG. 3 is a diagram illustrating a final output image resulting from a shear-warp method. As noted above, a shear-warp volume rendering algorithm transforms a volume to an intermediate coordinate system, referred to as the "sheared object space", in which voxel data can be projected efficiently. The transposed dataset having the set of slices most perpendicular to the viewing direction (principal viewing axis 330) is projected in sheared object space, and then the resulting intermediate image 340 is warped back from sheared object coordinates to image coordinates to produce the final output image 350.

In summary, this process can be written as a factorization of a view transformation matrix $M_{view}$ as follows:

$$M_{view} = M_{warp} \cdot M_{shear} \cdot P$$

where P is a permutation matrix which transposes the coordinate system in order to make the z-axis the principal viewing axis. The principal viewing axis is computed as follows:

$$\text{assuming } M_{view} = \begin{bmatrix} M_{11} & M_{12} & M_{13} \\ M_{21} & M_{22} & M_{23} \\ M_{31} & M_{32} & M_{33} \end{bmatrix}$$

In the preceding example, we only consider a 3×3 matrix, since the principal viewing axis can be computed from the volume rotation. However, it is to be appreciated that, in general, the present invention may be implemented using matrices having different numbers of rows and columns that those specifically described herein, while maintaining the spirit and scope of the present invention.

Then the viewing direction vector transformed to object space is as follows:

$$\vec{v}_o = \begin{bmatrix} M_{12} \cdot M_{23} - M_{22} \cdot M_{13} \\ M_{21} \cdot M_{13} - M_{11} \cdot M_{23} \\ M_{11} \cdot M_{22} - M_{21} \cdot M_{12} \end{bmatrix} = \begin{bmatrix} V_{ox} \\ V_{oy} \\ V_{oz} \end{bmatrix} \quad \text{(cramers rule)}$$

The principal viewing axis is found by computing $$C = \text{Max}(|V_{ox}|, |V_{oy}|, |V_{oz}|)$$

If $C = |V_{ox}|$, then the principal viewing axis is the $x_o$ axis. If $C = |V_{oy}|$, then the principal viewing axis is the $y_o$ axis; otherwise, the principal viewing axis is the $z_o$ axis.

Let $P_{xo}$, $P_{yo}$, and $P_{zo}$ be the permutation matrices for the principal viewing axes $x_o$, $y_o$, and $z_o$, respectively. Lacroute et al. defines the preceding permutation matrices as follows:

$$P_{xo} = \begin{bmatrix} 0 & 1 & 0 & 0 \\ 0 & 0 & 0 & 1 \\ 1 & 0 & 0 & 0 \\ 0 & 0 & 0 & 1 \end{bmatrix} \quad P_{yo} = \begin{bmatrix} 0 & 0 & 1 & 0 \\ 1 & 0 & 0 & 0 \\ 0 & 1 & 0 & 0 \\ 0 & 0 & 0 & 1 \end{bmatrix} \quad P_{zo} = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

In contrast, the modified permutation matrices according to an illustrative embodiment of the present invention are as follows:

$$P_{xo} = \begin{bmatrix} 1 & 0 & 0 & 0 \\ 0 & 0 & 1 & 0 \\ 0 & 1 & 0 & 0 \\ 0 & 0 & 0 & 1 \end{bmatrix} \quad P_{yo} = \begin{bmatrix} 0 & 0 & 1 & 0 \\ 0 & 1 & 0 & 0 \\ 1 & 0 & 0 & 0 \\ 0 & 0 & 0 & 1 \end{bmatrix} \quad P_{zo} = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

Figure 4A:
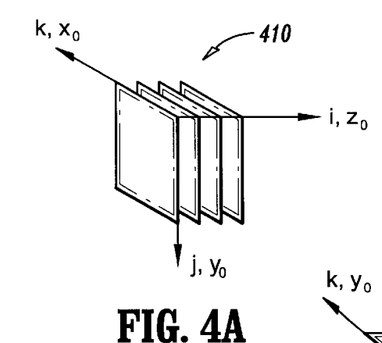
FIGS. 4A–C are diagrams illustrating the resulting correspondence between axes in permuted object coordinates (i, j, k) and object coordinates, when the permutation matrices according to the illustrative embodiment of the present invention are used.
Figures 4B, 4C:
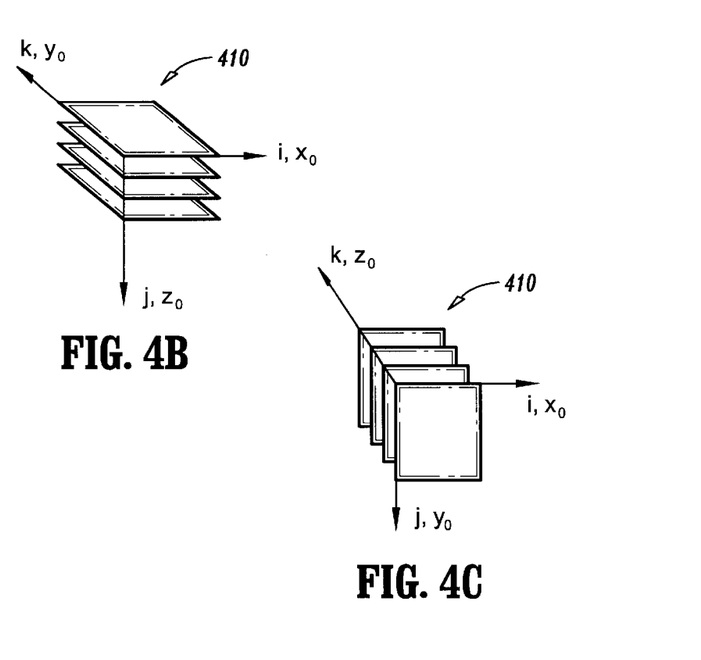
Figure 5A:
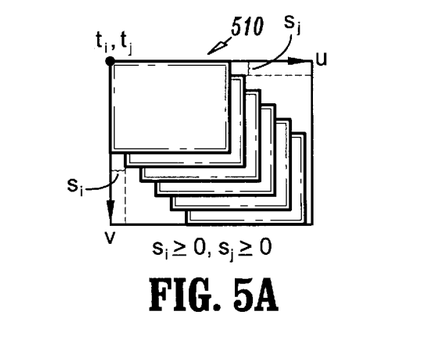
FIGS. 5A–D are diagrams illustrating slices 510 from $k_o$ to $k_{max}$ when the origin of the intermediate image is repositioned according to an illustrative embodiment of the present invention.
Figure 5B:
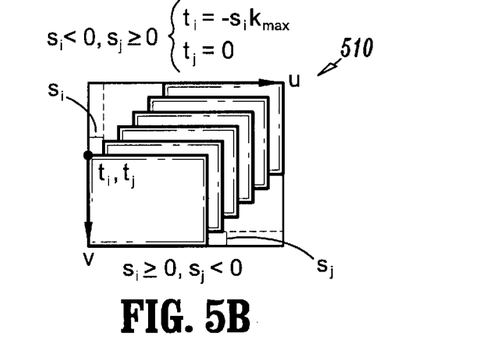
Figure 5C:
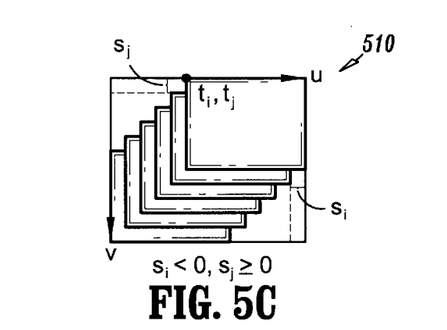
Figure 5D:
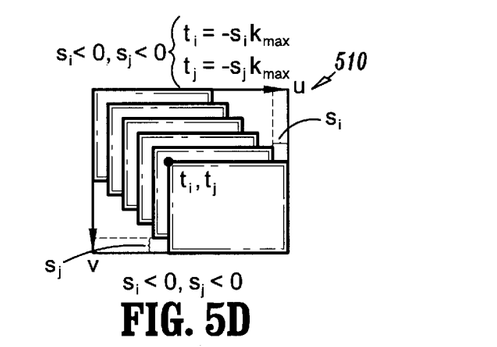

FIGS. 4A–C are diagrams illustrating the resulting correspondence between axes in permuted object coordinates (i, j, k) and object coordinates, when the permutation matrices according to the illustrative embodiment of the present invention are used. In particular, FIG. 4A corresponds to the case when the principal viewing axis is $x_o$, FIG. 4B corresponds to the case when the principal viewing axis is $y_o$, and FIG. 4C corresponds to the case when the principal viewing axis is $z_o$.

Notice how the volume slices 410 are oriented with respect to the permuted coordinate system. These permutations are more efficient, since now scanlines along $x_o$ remain aligned with the i axis in two of the three transposed views (the $y_o$ and $z_o$ view), while the $y_o$ and j axes are aligned in one of the views ($x_o$). These permutation matrices allow a faster computation of the transposed datasets. As is described below with respect to memory-efficient shear projection, these new permutations can also lead to efficient voxel traversal without having to store two additional transposed copies of the voxel data.

A description will now be given of memory-efficient shear projection according to an illustrative embodiment of the present invention.

Let M' view be a permuted viewing transformation matrix as follows:

$$M'_{view} = M_{view} \cdot P^{-1}$$

The preceding permuted viewing transformation matrix points from standard object space into image space (in standard object space the k axis is always the principal viewing axis). In standard object space, the viewing direction vector is as follows:

$$\overline{v}_{so} = P \cdot \overline{v}_o = \begin{bmatrix} M'_{12} \cdot M'_{23} - M'_{22} \cdot M'_{13} \\ M'_{21} \cdot M'_{13} - M'_{11} \cdot M'_{23} \\ M'_{11} \cdot M'_{22} - M'_{21} \cdot M'_{12} \end{bmatrix} = \begin{bmatrix} V_{soi} \\ V_{soj} \\ V_{sok} \end{bmatrix}$$

where $M'_{ij}$ are the elements of the permuted matrix M'. The shear projection matrix can then be defined as follows:

$$M_{shear} = \begin{bmatrix} 1 & 0 & s_i & 0 \\ 0 & 1 & s_j & 0 \\ 0 & 0 & 1 & 0 \\ 0 & 0 & 0 & 1 \end{bmatrix} \cdot \begin{bmatrix} 1 & 0 & 0 & t_i \\ 0 & 1 & 0 & t_j \\ 0 & 0 & 1 & 0 \\ 0 & 0 & 0 & 1 \end{bmatrix} = \begin{bmatrix} 1 & 0 & s_i & t_i \\ 0 & 1 & s_j & t_j \\ 0 & 0 & 1 & 0 \\ 0 & 0 & 0 & 1 \end{bmatrix}$$

where the shear coefficients $s_i$, $s_j$ are:

$$s_i = -\frac{V_{soi}}{V_{sok}} \quad \text{and} \quad s_j = -\frac{V_{soj}}{V_{sok}}$$

and $t_i$, $t_j$ are translation factors necessary in order to reposition the origin at the top-left corner of the intermediate image, with slices from $k_o$ to $k_{max}$ as follows:

$$s_i \geq 0, s_j \geq 0 \begin{cases} t_i = 0 \\ t_j = 0 \end{cases} \quad s_i \geq 0, s_j \geq 0 \begin{cases} t_i = 0 \\ t_j = s_j \cdot k_{max} \end{cases}$$

FIGS. 5A–D are diagrams illustrating slices 510 from $k_o$ to $k_{max}$ when the origin of the intermediate image is repositioned according to an illustrative embodiment of the present invention. In particular, FIG. 5A corresponds to the case when $s_i>0$, $S_j>0$, FIG. 5B corresponds to the case when $s_i>0$, $S_j<0$, FIG. 5C corresponds to the case when $s_i<0$, $S_j>0$, and FIG. 5D corresponds to the case when $s_i<0$, $S_j<0$.

Figure 6A:
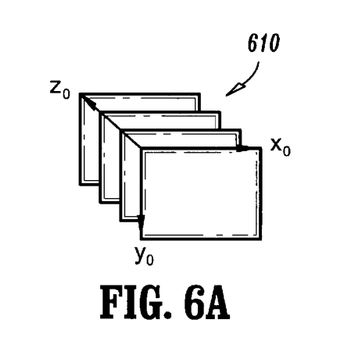
FIGS. 6A–C are diagrams illustrating a shear projection 610 according to the prior art.
Figure 6B:
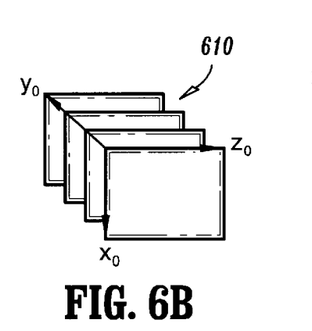
Figure 6C:
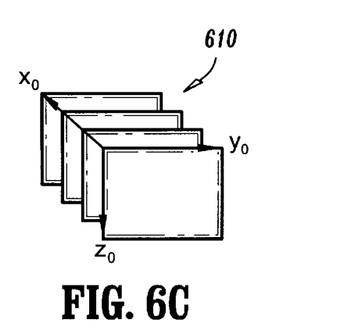

When the principal viewing axis is $z_o$, the slices 510 are projected from ($t_i$, $t_j$) to ($t_i+s_iK_{max}$, $t_j+S_jK_{max}$). When the principal viewing axis is $x_o$ or $y_o$, the current algorithms (e.g., by Klein & Kuebler, Lacroute & Levoy, and so forth) use two additional sets of transposed volume slices to perform a shear projection as shown in FIGS. 6A–C. FIGS. 6A–C are diagrams illustrating a shear projection 610 according to the prior art. In particular, FIG. 6A corresponds to the case when $z_o$ is the principal viewing axis and the original dataset is used, FIG. 6B corresponds to the case when $y_o$ is the principal viewing axis and the additional transposed dataset is used, and FIG. 6C corresponds to the case when $x_o$ is the principal viewing axis and the additional transposed dataset is used.

Figure 7A:
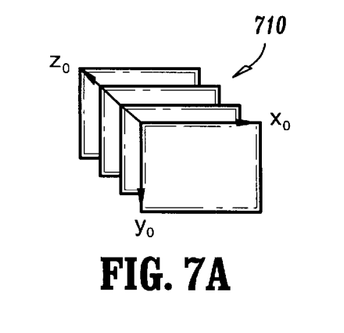
FIGS. 7A–C are diagrams illustrating transposed volume slices 710 resulting from permutation matrices according to an illustrative embodiment of the present invention.
Figure 7B:
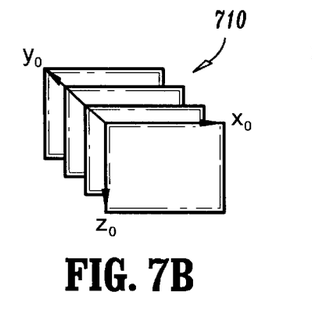
Figure 7C:
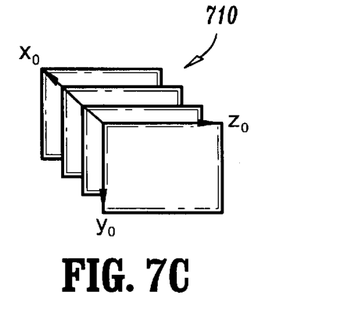

In contrast, using the permutation matrices according to the illustrative embodiment of the present invention, if we were to create additional transposed datasets, the transposed volume slices would be as shown in FIGS. 7A–C. FIGS. 7A–C are diagrams illustrating transposed volume slices 710 resulting from permutation matrices according to an illustrative embodiment of the present invention. In particular, FIGS. 7A–C correspond to the case when $z_o$, $y_o$, and $x_o$ is the principal viewing axis, respectively.

Figure 8:
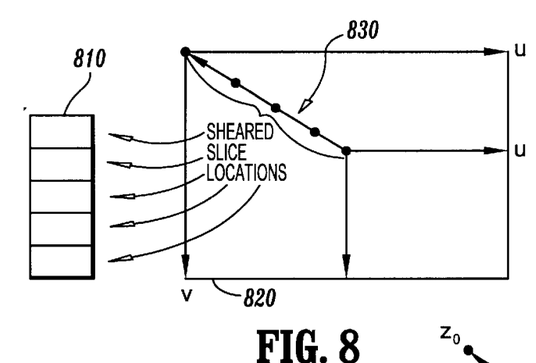
FIG. 8 is a diagram illustrating a look-up table (LUT) 810, according to an illustrative embodiment of the present invention.

However, the memory efficient algorithm of the present invention advantageously does not require the generation of two additional transposed views. Instead, all the integer pixel locations of the desired sheared slice positions from ($t_i$, $t_j$) to ($k_i+s_iK_{max}$, $t_j+s_jK_{max}$) are stored into a look-up table (LUT) as shown in FIG. 8. FIG. 8 is a diagram illustrating a look-up table (LUT) 810, according to an illustrative embodiment of the present invention.

The projected slice locations can be stored in the LUT 810 directly as memory offsets into the frame buffer (u, v) 820. Notice that these locations may overlap, depending on how much the volume is being sheared. However, the deltas (differences) between each location will never be greater than 1 pixel offset in u or v.

According to one illustrative embodiment of the present invention, the LUT is implemented as follows:

$$LUT(k) = (v \cdot u_{max}) + u$$

$$K = 0 \text{ to } k_{max}$$

where:
$u = A_i + S_i \cdot k$
$v = A_j + S_j \cdot k$
$u_{max}$ = width of framer buffer−1
$v_{max}$ = height of framer buffer−1
$k_{max}$ = total slices−1

A description will now be given of how the LUT elements 810 can be used as starting positions for the shear projection, for accessing the original dataset in a voxel-by-voxel, row-by-row, slice-by-slice fashion. If the principal viewing axis is $z_o$, then the use of the LUT 810 is trivial: each LUT element is the slice offset. Every row in a slice is projected from the current LUT location, moving along the vertical direction.

Figure 9A:
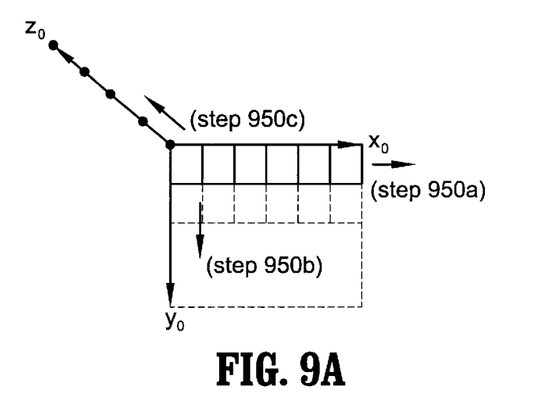
FIG. 9A is a diagram illustrating projections corresponding to a shear-warp voxel projection method in which the principal axis is $z_o$, according to an illustrative embodiment of the present invention.

A description will now be given of shear projection according to an illustrative embodiment of the present invention in the case when the principal axis is $z_o$. FIG. 9A is a diagram illustrating projections corresponding to a shear-warp voxel projection method in which the principal axis is $z_o$, according to an illustrative embodiment of the present invention.

Figure 9B:
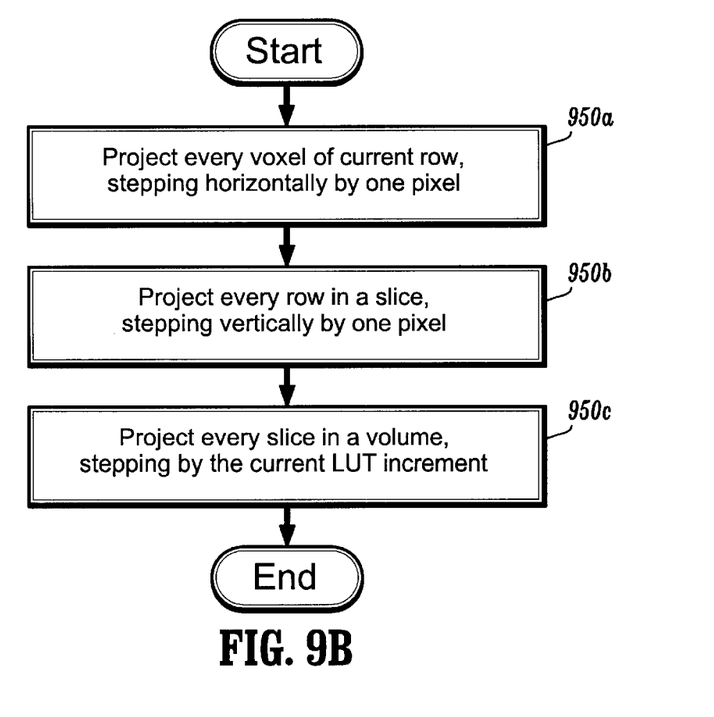
FIG. 9B is a flow diagram illustrating a method for shear projection in a shear-warp volume rendering method for the case when the principal axis is $z_o$, according to an illustrative embodiment of the present invention.

FIG. 9B is a flow diagram illustrating a method for shear projection in a shear-warp volume rendering method for the case when the principal axis is $z_o$, according to an illustrative embodiment of the present invention. The method of FIG. 9B employs the look-up table (LUT) 810 shown in FIG. 8. Every voxel of the current row is projected, stepping horizontally by one pixel (step 950a). Every row in a slice is projected, stepping vertically by one pixel (step 950b). Every slice in a volume is projected, stepping by the current LUT increment as specified in the LUT 810 (step 950c).

Figure 10A:
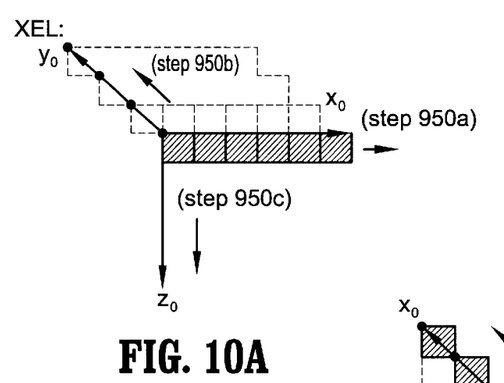
FIG. 10A is a diagram illustrating projections corresponding to a shear-warp voxel projection method in which the principal axis is $y_o$, according to an illustrative embodiment of the present invention.

A description will now be given of shear projection according to an illustrative embodiment of the present invention in the case when the principal axis is $y_o$. FIG. 10A is a diagram illustrating projections corresponding to a shear-warp voxel projection method in which the principal axis is $y_o$, according to an illustrative embodiment of the present invention.

Figure 10B:
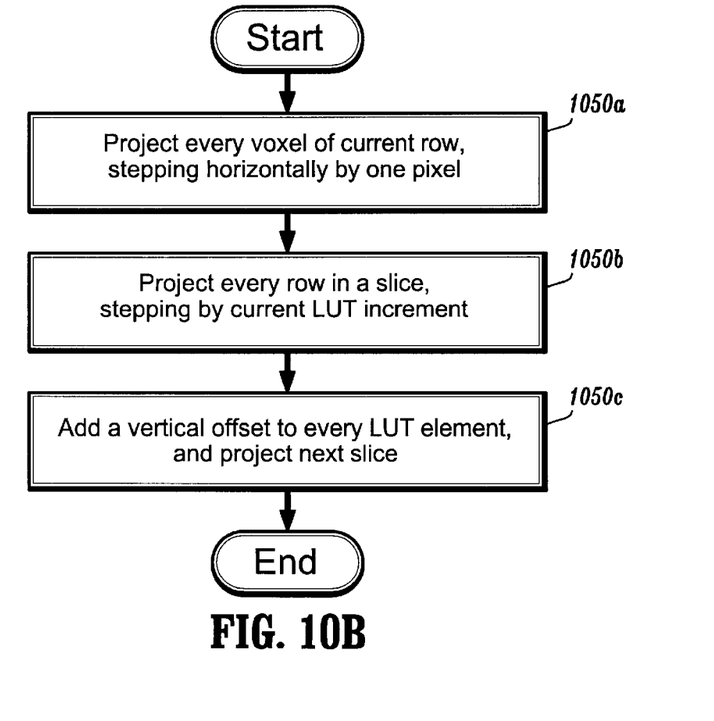
FIG. 10B is a flow diagram illustrating a method for shear projection in a shear-warp volume rendering method for the case when the principal axis is $y_o$, according to an illustrative embodiment of the present invention.

FIG. 10B is a flow diagram illustrating a method for shear projection in a shear-warp volume rendering method for the case when the principal axis is $y_o$, according to an illustrative embodiment of the present invention. The method of FIG. 10B employs the look-up table (LUT) 810 shown in FIG. 8. If the principal viewing axis is $y_o$, the LUT offsets are used to increment the row positions. When moving to the next slice, the LUT offsets specified in the LUT 810 are incremented in the vertical direction by one pixel as follows with respect to steps 1050*a–c*.

Every voxel of the current row is projected, stepping horizontally by one pixel (step 1050*a*). Every row in a slice is projected, stepping by the current LUT increment as specified in the LUT 810 (step 1050*b*). A vertical offset is added to every LUT element in the LUT 810, and the next slice is projected (step 1050*c*).

Figure 11A:
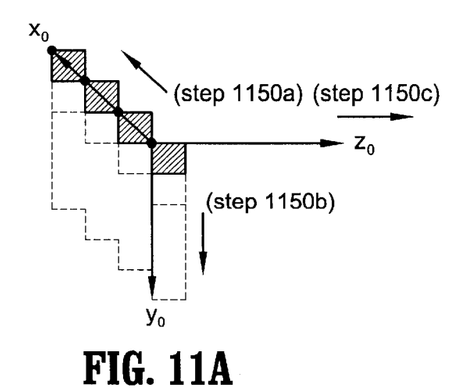
FIG. 11A is a diagram illustrating projections corresponding to a shear-warp voxel projection method in which the principal axis is $x_o$, according to an illustrative embodiment of the present invention.

A description will now be given of shear projection according to an illustrative embodiment of the present invention in the case when the principal axis is $x_o$. FIG. 11A is a diagram illustrating projections corresponding to a shear-warp voxel projection method in which the principal axis is $x_o$, according to an illustrative embodiment of the present invention.

Figure 11B:
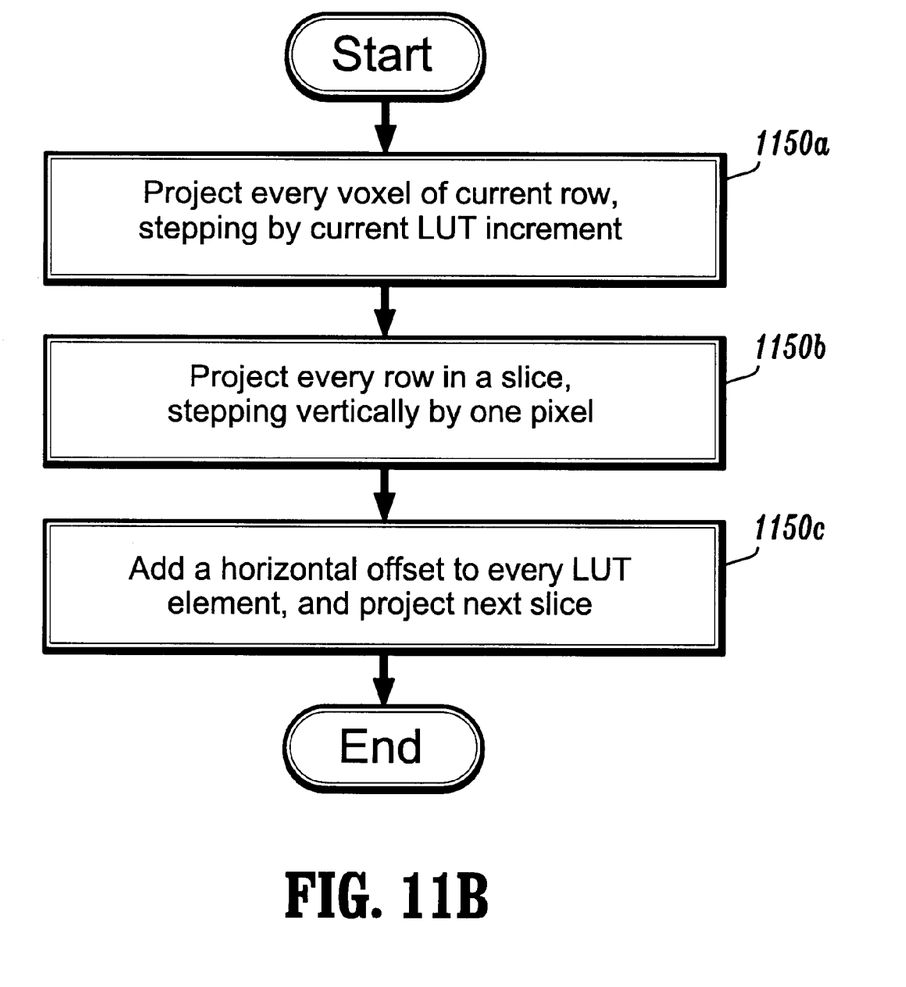
FIG. 11B is a flow diagram illustrating a method for shear projection in a shear-warp volume rendering method for the case when the principal axis is $x_o$, according to an illustrative embodiment of the present invention.

FIG. 11B is a flow diagram illustrating a method for shear projection in a shear-warp volume rendering method for the case when the principal axis is $x_o$, according to an illustrative embodiment of the present invention. The method of FIG. 11B employs the look-up table (LUT) 810 shown in FIG. 8. If the principal viewing axis is $x_o$, the LUT offsets specified in the LUT 810 are used to increment the voxel positions. When moving to the next row, a one-pixel vertical offset is added, and when moving to the next slice, a one-pixel horizontal offset is added as follows with respect to steps 1150*a–c*.

Every voxel of the current row is projected, stepping by the current LUT increment specified in the LUT 810 (step 1150*a*). Every row in a slice is projected, stepping vertically by one pixel (step 1150*b*). A horizontal offset is added to every LUT element in the LUT 810, and the next slice is projected (step 1150*c*).

A description of some of the many advantages of the present invention will now be given. Since the LUT elements represent all the locations where permuted parallel slices are going to be projected, the method of the present invention produces results at least identical to existing shear-warp algorithms with respect to image rendering, but with the following advantages over the existing shear-warp algorithms. The pre-processing time to generate transposed slices is not needed. The triple redundancy of allocated memory for transposed data is not needed. It is not necessary to access memory addresses in transposed order (which also would require all the volume slices to be located in memory).

The method of the present invention has very low memory requirements since, for example, the original voxel data is preferably always accessed in a slice-by-slice fashion. Therefore, as long as the computer has enough memory to hold one slice of data, volumes with an unlimited number of slices can be rendered.

In terms of computational complexity, the method of the present invention requires an additional table look-up per scanline when the principal axis is $y_o$, and an additional table look-up and one addition per voxel when the principal axis is $x_o$. Also, the LUT offsets in the look-up table are incremented when moving onto another slice. The cost of these additional computations is still very low. For example, using an Intel Pentium II Processor, the performance penalty has been observed to be at most 5% when $y_o$ is the principal axis and 15% when $x_o$ is the principal axis. MMX acceleration has been used for the $z_o$ and $y_o$ views.

A description will now be given of front-to-back projection, according to an illustrative embodiment of the present invention. The voxel traversal scheme described below can be used for M.I.P. (Maximum Intensity Projection) renderings, where a particular back-to-front or front-to-back ordering is not needed. However, to produce true volume renderings with shading and/or alpha blending, a front-to-back projection order is preferable.

Figure 12:
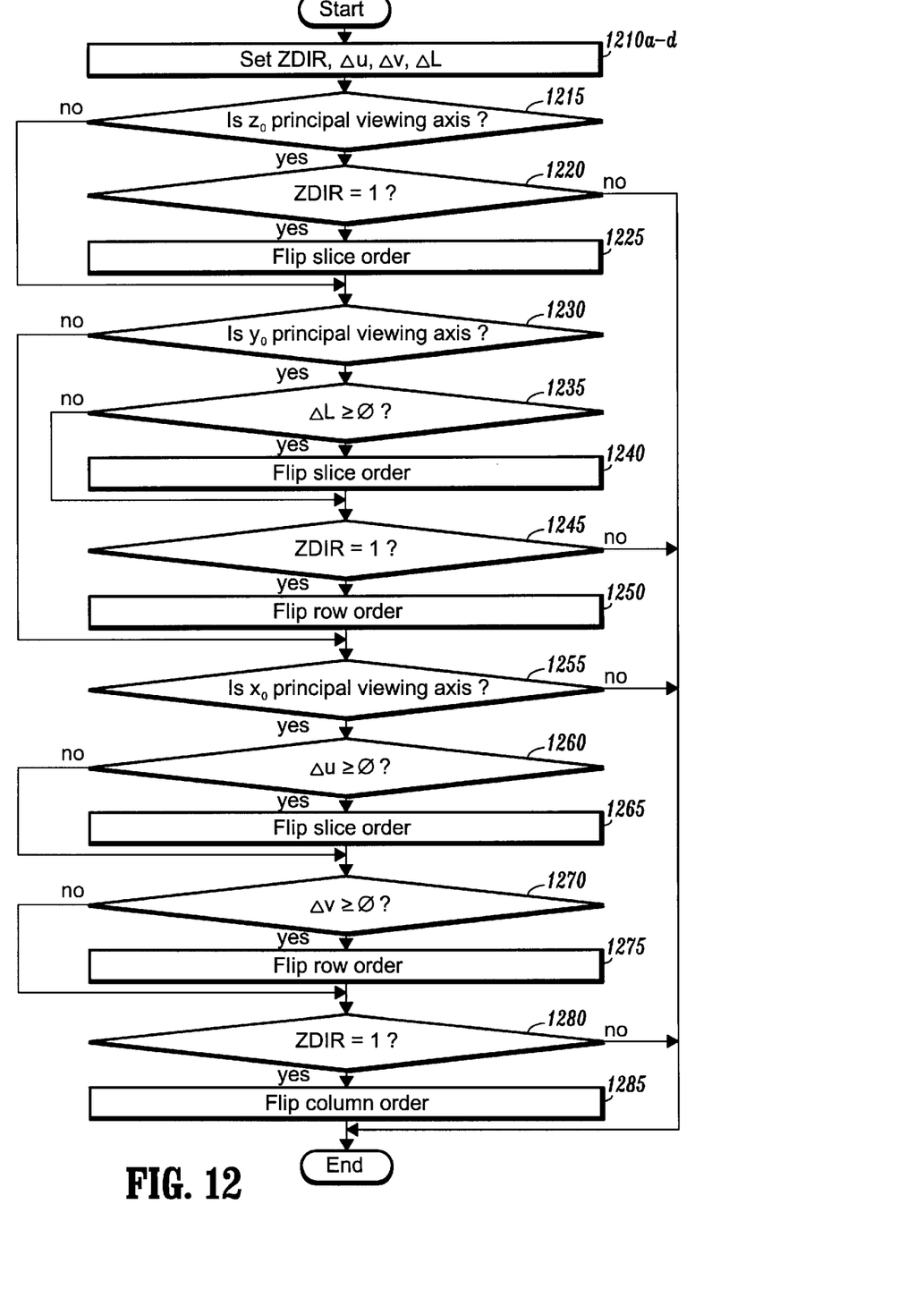
FIG. 12 is a flow diagram illustrating a method for projecting voxels in front-to-back order, according to an illustrative embodiment of the present invention.

To project voxels in front-to-back (FTB) order, the following approach is employed as described with respect to FIG. 12. FIG. 12 is a flow diagram illustrating a method for projecting voxels in front-to-back order, according to an illustrative embodiment of the present invention.

Set ZDIR to be the sign of the principal viewing axis, encoded as ø if positive, and 1 if negative (step 1210*a*). Set Δu to be the difference between $u(k_{max})$ and $u(\emptyset)$ (step 1210*b*). Set Δv to be the difference between $v(k_{max})$ and $v(\emptyset)$ (step 1210*c*). Set ΔL to be the difference between $LUT(k_{max})$ and $LUT(\emptyset)$ (step 1210*d*). It is to be appreciated that steps 1210*a–d* are directed to the setting/selection of variables to represent values used in the steps that follow. Thus, other designations may be used in place of the variables selected, while maintaining the spirit and scope of the present invention.

It is determined whether $z_o$ is the principal viewing axis (step 1215). If $z_o$ is not the principal viewing axis, then the method proceeds to step 1230. However, if $z_o$ is the principal viewing axis, then it is determined whether ZDIR=1 (step 1220). If ZDIR≠1, then the method is terminated. However, if ZDIR=1, then the slice ordering is flipped (step 1225), and the method is terminated.

At step 1230, it is determined whether $y_o$ is the principal viewing axis. If $y_o$ is not the principal viewing axis, then the method proceeds to step 1255. However, if $y_o$ is the principal viewing axis, then it is determined whether ΔL≧ø (step 1235). If ΔL<ø, then the method proceeds to step 1245. However, if ΔL≧ø, then the slice order is flipped (step 1240), and the method proceeds to step 1245.

At step 1245, it is determined whether ZDIR=1. If ZDIR≠1, then the method is terminated. However, if ZDIR=1, then the row order is flipped (step 1250), and the method is terminated.

At step 1255, it is determined whether $x_o$ is the principal viewing axis. If $x_o$ is not the principal viewing axis, then the method is terminated. However, if $x_o$ is the principal viewing axis, then it is determined whether Δu≧ø (step 1260). If Δu<ø, then the method proceeds to step 1270. However, if Δu≧ø, then the slice order is flipped (step 1265), and the method proceeds to step 1270.

At step 1270, it is determined whether Δv≧ø. If Δv<ø, then the method proceeds to step 1280. However, if Δv≧ø, then the row order is flipped (step 1275), and the method proceeds to step 1280.

At step 1280, it is determined whether ZDIR=1. If ZDIR≠1, then the method is terminated. However, if ZDIR=1, then the column order is flipped (step 1285), and the method is terminated.

An advantage of FTB projection is that once a frame buffer location contains a fully opaque value, no other voxels need to be projected at that location. This is equivalent to the "early ray termination" effect achieved with different algorithms (i.e., ray tracing).

A description will now be given of the resampling of a volume, according to an illustrative embodiment of the present invention.

Figure 13:
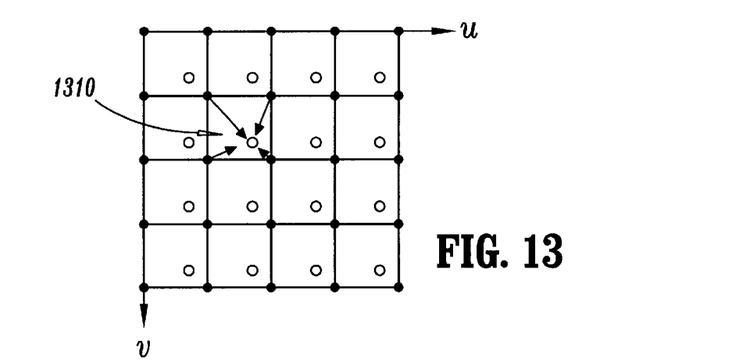
FIG. 13 is a graph illustrating resampling weights 1310 as a function of u and v, according to an illustrative embodiment of the present invention.

Herein above, it has been shown how the volume slices, rows and columns are traversed and projected at integer frame buffer locations. The actual shear offsets for each projected slice, however, are fractional values. Even if it is possible to generate fast renderings of acceptable quality simply projecting into integer locations, for high-quality renderings this algorithm must resample each voxel slice when it translates the slice into sheared object space. A useful property of orthographic projections is that, when projecting parallel slices into sheared object space (i.e. when the principal viewing direction is $z_o$), every voxel in a given slice has the same resampling weights as shown in FIG. 13. FIG. 13 is a graph illustrating resampling weights 1310 as a function of u and v, according to an illustrative embodiment of the present invention. In FIG. 13, integer locations are depicted as filled-in circles, while fractional locations are depicted as hollow (unfilled) circles.

If we allow the look-up table shown in FIG. 8 to hold resampling weights 1310, in addition to integer frame buffer locations, then it follows that: if the principal viewing direction is $z_o$, then each LUT entry contains resampling weights 1310 which can be used for all voxels in a slice. Moreover, if the principal viewing direction is $y_o$, then each LUT entry contains resampling weights 1310 which can be used for all voxels in a row. Further, if the principal viewing direction is $x_o$, then each LUT entry contains resampling weights 1310 which can be used for the current projected voxel.

Resampling can be performed with bi-linear interpolation between four neighboring voxels. If the principal viewing direction is $z_o$, then the four neighboring voxels are located on two adjacent scanlines of the same slice. If the principal viewing direction is $y_o$, then two of the neighboring voxels are located on a scanline of one slice, and the other two are located on a scanline of the adjacent slice. If the principal viewing direction is $x_o$, then two of the neighboring voxels are located on two adjacent scanlines of one slice, and the other two neighboring voxels are located on two adjacent scanlines of the adjacent slice. Therefore bi-linear interpolation requires a minimum of two adjacent slices of memory storage, while nearest-neighbor resampling requires only a minimum of one slice of memory storage.

Figure 14A:
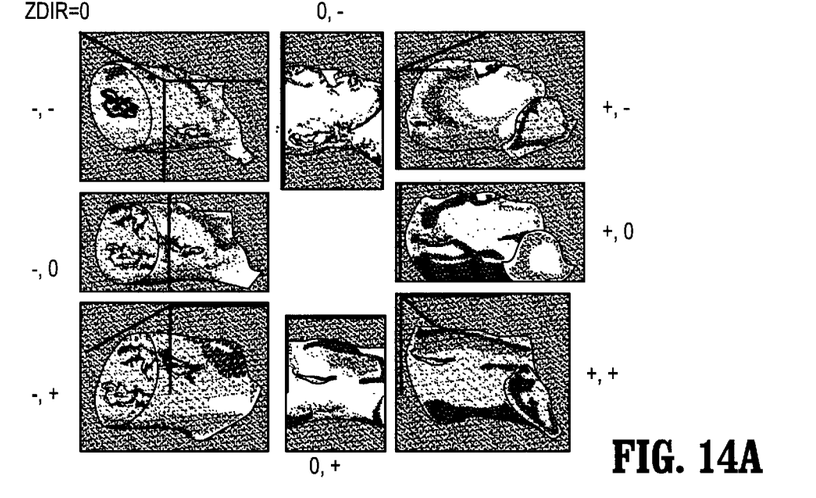
FIGS. 14A–B are sequences of images illustrating the results produced by an illustrative embodiment of the present invention.
Figure 14B:
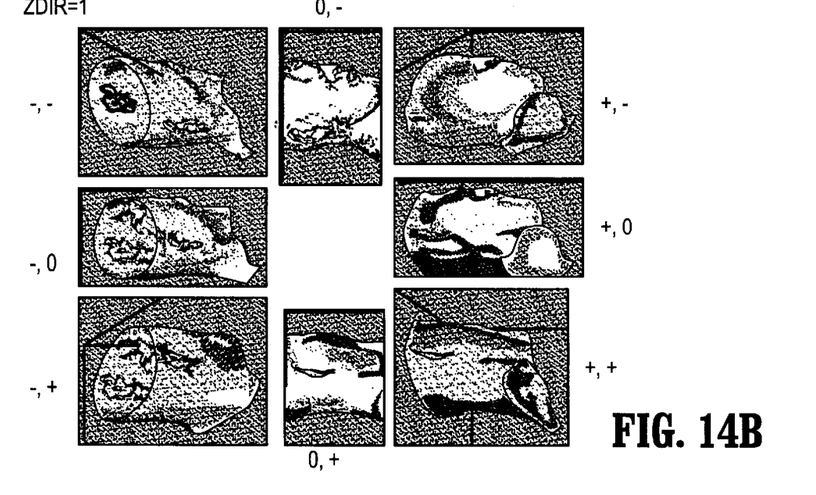

A description will now be given of experimental test results obtained by the present invention, according to an illustrative embodiment of the present invention. FIGS. 14A–B are sequences of images illustrating the results produced by an illustrative embodiment of the present invention when projecting a volume in sheared object space, with the principal viewing direction being xo, ZDIR being a Boolean flag indicating if the viewing direction is negative, and the symbols +, −, Ø indicating the positive, negative or zero values of Δu and Δv.

A description will now be given of a final warp performed in the shear-warp voxel projection method of the present invention, according to an illustrative embodiment of the present invention.

The final warp matrix $M_{warp}$ can be computed as follows:

$$M_{warp2D} = \begin{bmatrix} (M'_{11} & M'_{12} & (M'_{14} - k_i M'_{11} - k_j M'_{12}) \\ (M'_{21} & M'_{22} & (M'_{24} - k_i M'_{21} - k_j M'_{22}) \\ 0 & 0 & 1 \end{bmatrix}$$

The final warp in the shear-warp voxel projection method of the present invention may be implemented to be equivalent to that of other existing algorithms. We chose to use a function which performs an affine transform with bilinear or bicubic interpolation, utilizing MMX technology for higher performance.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A method for generating an image of a three-dimensional (3D) volume from a plurality of slices corresponding to a scan of the 3D volume, each of the plurality of slices comprising slice data for sample points within an image plane, each of the sample points being stored sequentially in rows of scan lines, said method comprising the steps of:

selecting a permutation matrix such that each of the sample points stored in the scan lines of all of the plurality of slices can be projected in a sequential order without requiring the slice data to be transposed for two out of three dominant viewing directions respectively corresponding to two of out of three dimensions; and rendering the image by accessing the sample points in a voxel-by-voxel, row-by-row, and slice-by-slice sequence.

2. The method of claim 1, further comprising the step of constructing a look-up table (LUT) having a plurality of entries for storing at least integer pixel locations of shear projection coordinates that represent sheared locations to be used in a sheared projection of the sample points onto an intermediate shear image buffer, and wherein said rendering step accesses the sample points according to the LUT.

3. The method of claim 2, wherein the integer pixel locations of the shear projection coordinates are stored in the LUT as memory offsets to a frame buffer.

4. The method of claim 2, wherein each of the plurality of entries comprises a slice offset when a principal viewing axis of the image is a $z_o$ axis, and said method comprises the steps of:

projecting every voxel of a current row, stepping horizontally by a single pixel;

projecting each of the rows in a current slice, stepping vertically by the single pixel pixel;

projecting each of the plurality of slices, stepping by a current LUT increment specified in the LUT.

5. The method of claim 2, wherein each of the plurality of entries comprises a slice offset when a principal viewing axis of the image is a $y_o$ axis, and said method comprises the steps of:

projecting every voxel of a current row, stepping horizontally by a single pixel;

projecting each of the rows in a current slice, stepping by a current LUT increment specified in the LUT;

adding a vertical offset to every LUT element in the LUT, and projecting a next slice.

6. The method of claim 2, wherein each of the plurality of entries comprises a slice offset when a principal viewing axis of the image is an $x_o$, axis, and said method comprises the steps of:
projecting every voxel of a current row, stepping by a current LUT increment specified in the LUT;
projecting each of the rows in a current slice, stepping vertically by a single pixel;
adding a horizontal offset to every LUT element in the LUT, and projecting a next slice.

7. The method of claim 1, wherein each of the scan lines have a same number of the sample points, and each of the plurality of slices have a same number of the scan lines.

8. The method of claim 1, wherein the two out of three dominant viewing directions consist of an x dominant viewing direction and a y dominant viewing direction.

9. The method of claim 1, wherein said method is implemented by a program storage device readable by machine, tangibly embodying a program of instructions executable by the machine to perform said method steps.

10. A method for generating an image of a three-dimensional (3D) volume from a plurality of slices corresponding to a scan of the 3D volume, each of the plurality of slices comprising slice data for sample points within an image plane, each of the sample points being stored sequentially in rows of scan lines, said method comprising the steps of:
selecting a permutation matrix such that each of the sample points stored in the scan lines of all of the plurality of slices can be projected in a sequential order without requiring the slice data to be transposed for two out of three dominant viewing directions respectively corresponding to two of out of three dimensions;
constructing a look-up table (LUT) having a plurality of entries for storing integer pixel locations of shear projection coordinates that represent sheared locations to be used in a sheared projection of the sample points onto an intermediate shear image buffer; and
rendering the image by accessing the sample points in a voxel-by-voxel, row-by-row, and slice-by-slice sequence.

11. The method of claim 10, wherein the integer pixel locations of the shear projection coordinates are stored in the LUT as memory offsets to a frame buffer.

12. The method of claim 10, wherein each of the plurality of entries comprises a slice offset when a principal viewing axis of the image is a $z_o$ axis, and said method comprises the steps of:
projecting every voxel of a current row, stepping horizontally by a single pixel;
projecting each of the rows in a current slice, stepping vertically by the single pixel pixel;
projecting each of the plurality of slices, stepping by a current LUT increment specified in the LUT.

13. The method of claim 10, wherein each of the plurality of entries comprises a slice offset when a principal viewing axis of the image is a $y_o$ axis, and said method comprises the steps of:
projecting every voxel of a current row, stepping horizontally by a single pixel;
projecting each of the rows in a current slice, stepping by a current LUT increment specified in the LUT;
adding a vertical offset to every LUT element in the LUT, and projecting a next slice.

14. The method of claim 10, wherein each of the plurality of entries comprises a slice offset when a principal viewing axis of the image is an $x_o$ axis, and said method comprises the steps of:
projecting every voxel of a current row, stepping by a current LUT increment specified in the LUT;
projecting each of the rows in a current slice, stepping vertically by a single pixel;
adding a horizontal offset to every LUT element in the LUT, and projecting a next slice.

15. The method of claim 10, wherein each of the scan lines have a same number of the sample points, and each of the plurality of slices have a same number of the scan lines.

16. The method of claim 10, wherein the two out of three dominant viewing directions consist of an x dominant viewing direction and a y dominant viewing direction.

17. The method of claim 10, wherein said method is implemented by a program storage device readable by machine, tangibly embodying a program of instructions executable by the machine to perform said method steps.

18. A method for generating an image of a three-dimensional (3D) volume from a plurality of slices corresponding to a scan of the 3D volume, each of the plurality of slices comprising slice data for sample points within an image plane, each of the sample points being stored sequentially in rows of scan lines, said method comprising the steps of:
determining a dominant axis of a viewing transformation chosen for generating an image of the three-dimensional volume;
selecting a permutation matrix such that each of the sample points stored in the scan lines of all of the plurality of slices can be projected in a sequential order without requiring the slice data to be transposed for two out of three dominant viewing directions respectively corresponding to two of out of three dimensions;
factorizing a permuted viewing transformation to obtain shear and warp transformation matrices;
computing a size of an intermediate shear image buffer in which all of the sample points will be projected;
computing a set of shear projection coordinates that represent sheared locations to be used for a sheared projection of the sample points onto the intermediate shear image buffer, according to the shear transformation matrix;
determining an optimal traversal order through the sample points, based on a first determination of whether each of the plurality of slices are to be traversed sequentially front-to-back or back-to-front, a second determination of whether the scan lines are to be traversed sequentially top to bottom or bottom to top, and a third determination of whether the scan lines are to be traversed sequentially from left to right or from right to left;
traversing and projecting the sample points stored in each of the scan lines;
warping a resulting shear image buffer onto the image, according to the shear transformation matrix.

19. The method of claim 18, wherein for a z dominant viewing direction said traversing and projecting steps comprise the step of employing the set of shear projection coordinates as an origin of each of a plurality of projected slices.

20. The method of claim 18, wherein for the y dominant viewing direction, said traversing and projecting steps comprise the steps of:

employing the set of shear projection coordinates as an origin of each of the scan lines; and incrementing the set of shear projection coordinates in a chosen slice direction.

21. The method of claim 18, wherein for a x dominant viewing direction, said traversing and projecting steps comprise the steps of:

employing the set of shear projection coordinates as a projection location of each of the sample points; and incrementing the set of shear projection coordinates in a chosen scan line and a chosen slice direction after each of the scan lines has been projected.

22. The method of claim 18, further comprising the step of interpolating a new sample point value at a projected location in the shear image buffer, using destination-driven interpolation.

23. The method of claim 18, wherein each of the scan lines have a same number of the sample points, and each of the plurality of slices have a same number of the scan lines.

24. The method of claim 18, wherein the two out of three dominant viewing directions consist of an x dominant viewing direction and a y dominant viewing direction.

25. The method of claim 18, wherein said method is implemented by a program storage device readable by machine, tangibly embodying a program of instructions executable by the machine to perform said method steps.

26. A program storage device having a program executable by a computer for performing method steps for generating an image of a three-dimensional (3D) volume from a plurality of slices corresponding to a scan of the 3D volume, each of the plurality of slices comprising slice data for sample points within an image plane, each of the sample points being stored sequentially in rows of scan lines, said method comprising the steps of:

selecting a permutation matrix such that each of the sample points stored in the scan lines of all of the plurality of slices can be projected in a sequential order without requiring the slice data to be transposed for two out of three dominant viewing directions respectively corresponding to two of out of three dimensions; and rendering the image by accessing the sample points in a voxel-by-voxel, row-by-row, and slice-by-slice sequence.

* * * * *